United States Patent [19]

Mandzy et al.

[11] Patent Number: 5,487,561
[45] Date of Patent: Jan. 30, 1996

[54] SAFETY BAG INFLATION APPARATUS USING A LIQUID PROPELLANT GAS GENERATOR

[75] Inventors: John Mandzy; David S. Degler, both of Pittsfield, Mass.

[73] Assignee: Martin Marietta Corporation, King of Prussia, Pa.

[21] Appl. No.: 352,949

[22] Filed: Dec. 9, 1994

[51] Int. Cl.$^6$ ..................................... B60R 21/28
[52] U.S. Cl. ........................................... 280/741; 280/736
[58] Field of Search ................................ 280/736, 741

[56] References Cited

U.S. PATENT DOCUMENTS 3,690,695  9/1972  Jones, Sr. ................................ 280/741
5,060,973  10/1991  Giovanetti ............................... 280/736

*Primary Examiner*—Kenneth R. Rice
*Attorney, Agent, or Firm*—Robert A. Cahill; Geoffrey H. Krauss

[57] ABSTRACT

To deploy an inflatable member, such as an occupant restraint safety bag in a motor vehicle, a buffer zone is pressurized by the firing of inflation initiator to release liquid propellant into the buffer zone through ruptured frangible seals in a stationary separator disk or in a movable piston for controlled ignition. The ignited liquid propellant generates a large volume of gas that is cooled and pressurize buffered prior to inflating introduction into the safety bag.

29 Claims, 2 Drawing Sheets

SAFETY BAG INFLATION APPARATUS USING A LIQUID PROPELLANT GAS GENERATOR

FIELD OF THE INVENTION

The present invention relates to safety apparatus and particularly to passive restraint apparatus utilizing an inflatable safety bag for preventing serious injury to an occupant of a motor vehicle involved in an accident.

BACKGROUND OF THE INVENTION

"Passive" restraint apparatus, which require no action by a vehicle occupant to make operative, as contrasted to "active" restraint apparatus requiring a conscious effort by an occupant to become operative (such as conventional seat belts), are now commonly being included as standard equipment in motor vehicles due to government agency, insurance industry, and consumer pressures. Experience and testing have shown that the most effective passive occupant restraint approach is to abruptly (in a matter of milliseconds) inflate a safety bag automatically in response to a sudden change in vehicle velocity occasioned by a high impact accident. The inflated safety bag pins the occupant in his/her seat, well cushioned from the effects of the accident for an interval sufficient to prevent serious injury.

The mechanics for timely inflating a safety bag are basically of two types. One type involves storing a liquefied gas under high pressure in a reservoir. On impact, the liquefied gas is released, which then converts to a gas, inflating the safety bag. The approach has numerous disadvantages. The bulk and weight of the components for handling the gas-producing liquid makes it difficult and expensive to package the safety apparatus in the steering column and dashboard of motor vehicles. Storage integrity over a long time period of widely varying ambient conditions is tenuous at best. Moreover, the most effective and practical gas-producing liquids are chlorofluorocarbons, such as FREON, usages of which are currently being seriously curtailed due to environmental concerns.

As a consequence, safety bag inflation through the release of liquefied gas has largely been supplanted by the use of ignitable propellants capable of rapidly generating large volumes of gas by exothermic reaction. Heretofore, the propellants have invariably been in a solid or granular form comprised of low energy compositions, such as an alkali metal azide, cupric oxide, boron nitrate, etc. The solid propellants need not be stored under pressure, are stable over time under varying ambient conditions, and are convenient to package in a passive restraint apparatus. There is however a significant drawback to solid propellants of this type, in that the generated gas contains toxic by-products and particulate matter. As a consequence, the safety bag inflating gases must be filtered to remove the toxic by-products and also to catch combusting particulate matter which is capable of burning holes in the safety bag. These filters increase the size, weight, and cost of a passive restraint apparatus.

As an alternative to the use of propellants in solid or granular form as the inflation gas generator, use of liquid propellants for this purpose is being investigated. A viable approach to using a liquid propellant in a safety bag inflater is disclosed in U.S. Pat. No. 5,060,973, issued to Giovanetti. The numerous advantages afforded by the use of liquid propellants in a safety bag inflation apparatus are noted in the Giovanetti patent, the disclosure of which is incorporated herein by reference.

SUMMARY OF THE INVENTION

An objective of the present invention is to provide an improved apparatus for exothermically generating large volumes of gas to deploy an inflatable member.

A further objective is to provide apparatus of the above character for abruptly inflating an occupant restraint safety bag in a motor vehicle.

An additional objective is to provide an occupant restraint apparatus of the above character, that affords certain improvements over safety bag inflation apparatus of the liquid propellant type disclosed in the Giovanetti patent.

Yet another objective is to provide occupant restraint apparatus of the above character, which is simple and efficient in construction, light weight, compact, economical to manufacture, and reliable and efficient in operation.

To achieve these objectives, the apparatus of the present invention, in its application as an occupant restraint for a motor vehicle, comprises an inflatable safety bag, a housing having at least one vent in inflating fluid flow communication with the safety bag, a reservoir of liquid propellant located in the housing, a buffer zone located in the housing, a first frangible seal separating the liquid propellant reservoir from the buffer zone, a second frangible seal separating the buffer zone from the housing vent, and an inflation initiator, operating in response to a high impact vehicular accident, for pressurizing the buffer zone to initiate rupture of the first and second frangible seals and to ignite the liquid propellant in the buffer zone, ignition of the liquid propellant generates, by exothermic reaction, a gas that flows from the buffer zone through the housing vent to inflate the safety bag.

Further in accordance with these objectives, the present invention provides a method for deploying an inflatable member that comprises the steps of providing a reservoir of liquid propellant, providing a buffer zone containing air, separating the liquid propellant reservoir and the buffer zone by a frangible seal, rupturing the frangible to initiate deployment of the inflatable member, igniting the liquid propellant released from the reservoir into the buffer zone to generate a gas by exothermic reaction, directing the gas through a cooling zone, and inflating the member with the cooled gas.

Additional features, advantages and objectives of the present invention will be set forth in the description which follows and in part will be apparent from the description, or may be learned by practice of the invention. The objectives and advantages of the present invention will be realized and obtained by the apparatus and method particularly pointed out in the following written description and the appended claims, as well in the accompanying drawings.

It will be understood that both the foregoing general description and the following detailed description are exemplary and explanatory and are intended to provide further explanation of the invention as claimed.

The accompanying drawings are intended to provide a further understanding of the invention and are incorporated in and constitute a part of the specification, illustrate a preferred embodiment of the invention, and together with the description, serve to explain the principles of the invention.

BRIEF DESCRIPTION OF THE DRAWINGS

Like reference numerals refer to corresponding parts throughout the several views of the drawings.

DETAILED DESCRIPTION OF PREFERRED EMBODIMENTS

Figure 1:
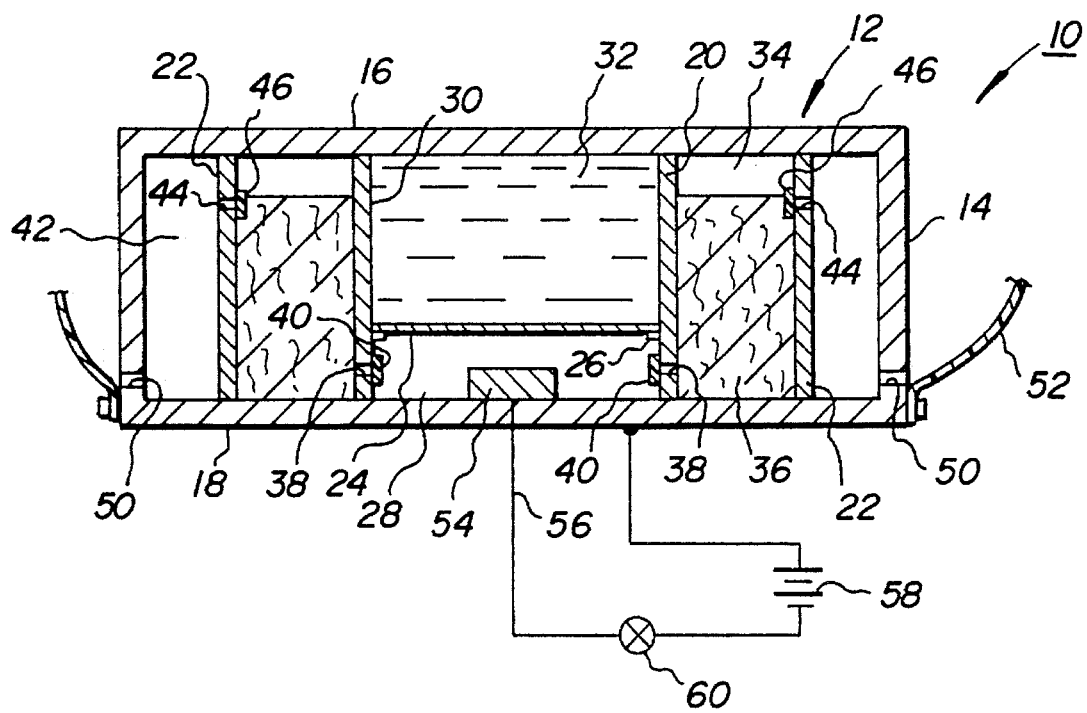
FIG. 1 is a sectional view of a safety bag inflation apparatus according to one embodiment of the present invention.

An apparatus in accordance with the present invention for deploying an inflatable member, such as a safety bag of an occupant restraint apparatus installed in a motor vehicle, is generally indicated at 10 in the embodiment illustrated in FIG. 1. The apparatus comprises a housing 12 consisting of a cylindrical sidewall 14 and conjoined, opposed endwalls 16 and 18. Centrally positioned in the housing in coaxial relation with sidewall 14 is a cylinder 20 whose ends are hermetically sealed against endwalls 16 and 18. A second cylinder 22 is positioned in the housing between cylinder 20 and sidewall 14 in mutual coaxial relation. Housing 12 and cylinders 20, 22 are formed as suitable material capable of withstanding elevated operating pressures, which may exceed 10 KPSI. Thus, steel, aluminum, and even reinforced plastic are candidate materials for the housing and cylinders.

A radial separator, in the form of a disk 24, is installed in cylinder 20 by any suitable means such as a C-clip 26, to divide the cylinder volume into a chamber 28 containing a suitable gas, preferably air, and a reservoir 30 containing a liquid propellant 32. As disclosed in the cited Giovanetti patent, the liquid propellant may be a hydroxyl ammonium nitrate-based liquid monopropellant. A particular suitable propellant composition comprises, by mass, approximately 60% hydroxyl ammonium nitrate as an oxidizer, 20% triethanol ammonium nitrate as a fuel, and 20% water as a solvent.

The periphery of disk 24 is suitably sealed to cylinder 20 to prevent leakage of liquid propellant from reservoir 30 into chamber 28. Disk 24, formed of a material that is chemically compatible with the liquid propellant, functions as a frangible seal capable of rupturing when subjected to elevated pressure. Preferably, the disk is constructed with a plurality of localized, structurally weakened zones that serve as frangible pressure points that rupture at an elevated pressure to provide vents or ports releasing the liquid propellant from the reservoir 30 into chamber 28 in a controlled manner. The separator disk 24 may be formed of a metal or a plastic that is chemically compatible with the liquid propellant. The same requirement of chemical compatibility is true for the housing and at least cylinder 20 materials. Alternatively, these members may be coated with a material that is chemically compatible with the liquid propellant.

The annular space between cylinders 20 and 22 provides an annular cooling zone or chamber 34 containing a gas cooling medium 36. The cooling medium may take the form of a porous metallic medium (metallic sponge), such as filings or shavings of a suitable metal, such as copper, capable of effectively absorbing heat from a gas flowing through it. Radial baffles (not shown) may be installed in the cooling chamber to prolong the gas flow path through the metallic sponge to enhance the extraction of heat from the gas. Alternatively, the gas cooling medium may take the form of a liquid capable of vaporizing when subjected to high temperature gas. Water treated with a suitable chemical, such as calcium carbonate, to raise the normal water vaporization temperature and lower than normal freezing temperature, is a preferred liquid form of gas coolant medium 36. Lowering the freezing temperature is a necessary requirement for operability of apparatus 10 in a winter environment.

Still referring to FIG. 1, an annular array of holes are drilled through cylinder 20 to serve as ports 38 providing fluid communication between air chamber 28 and cooling chamber 34, each of these ports is closed off by a frangible seal 40 capable of rupturing at elevated pressure. These frangible seals may simply be pieces of metallic foil adhesively secured over the ports. Pieces of a suitable plastic tape, such as MILAR tape may also serve as the requisite frangible seals. Alternatively, plugs of, for example, RTV silicon sealant may be used. Another viable alternative is to machine cylinder 20 to provide frangible pressure points that rupture at an elevated pressure to create ports 38.

The space between cylinder 22 and housing sidewall 14 provides an outer annular chamber 42 surrounding cooling chamber 34. Chamber 42 contains a suitable gas, preferably air. Fluid communication between chambers 34 and 42 is provided by an annular array of ports 44 in cylinder 22. These ports are normally closed by frangible seals 46 of the same character described above for frangible seals 40. An annular array of exit vents 50 are drilled through the housing sidewall 14 into air chamber 42. The mouth of an inflatable member or safety bag, fragmentally illustrated at 52, is hermetically sealed around housing sidewall 14 at a location such that exit ports 50 open into the interior of the air bag. The bag material is conventional, e.g., neoprene or silicon coated nylon.

Still referring to FIG. 1, an inflation initiator 54 is positioned in air chamber 28. An electrode 56 of the initiator is lead out through a hermetically sealed hole in endwall 18 for connection to one side of a vehicle battery 58 through a normally opened impact sensitive, inertial switch 60. The other side of the battery is connected to housing 12, such that a detonator firing circuit is completed upon closure of switch 60. It will be appreciated that the inflation initiator may be embodied in modular form, as disclosed in the cited Giovanetti patent.

To initiate inflation of safety bag 52, switch 60 is closed to energize the firing circuit, and a small charge within inflation initiator 54 is exploded to pressurize air chamber 28. This chamber serves as a pressure buffer zone to ensure that the initial pressure rise generated by the detonator does not exceed safe limits. When the pressure in chamber 28 rises to a sufficient level, frangible seal disk 24 will rupture to release liquid propellant 32 into chamber 28. Combusting matter spewed into chamber 28 by the exploded charge ignites the liquid propellant in chamber 28, resulting in the generation of gas by exothermic reaction. Chamber 28 will then be further pressurized to rupture frangible seals 40 blocking ports 38 into cooling chamber 34. Note that ports 38 are positioned close to endwall 18 and thus sufficiently axially spaced from liquid propellant reservoir 30 to ensure that only the generated gas and not the raw liquid propellant flows through these exposed ports.

The generated gas flowing through ports 38 pressurizes cooling chamber 34, causing seals 46 to rupture and unblock ports 44. Note that these ports 44 are located proximate endwall 16 and thus are axially spaced from ports 38. Consequently, the gas flows through the cooling media 36 and exits cooling chamber 34 through the now opened ports 44 into air chamber 42, which serves as a second pressure buffer zone. From annular chamber 42, the gas flows through housing vents 50 to inflate safety bag 52. As illustrated, housing vents 52 are formed on sidewall 14 at locations adjacent endwall 18, and thus are axially spaced from the air chamber entry ports 44.

In the practice of the embodiment of the present invention seen in FIG. 1, it may be determined that the second buffer zone provided by air chamber 42 is unnecessary. In this case, cylinder 22 would be omitted, and the cylindrical housing wall 14 would then serve as the outer defining wall for cooling chamber 34. Vents 50 would then be in positions represented by ports 44, i.e., adjacent endwall 16. These vents would preferably be normally blocked by frangible seals corresponding to seals 46.

Figure 2:
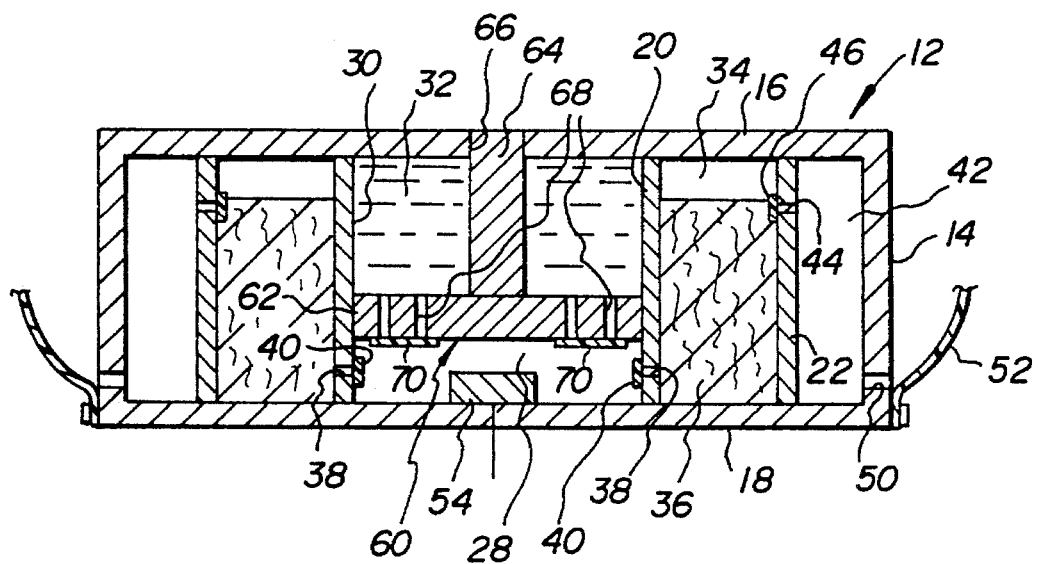
FIG. 2 is a sectional view of a safety bag inflation apparatus according to a second embodiment of the present invention.

The embodiment of the invention illustrated in FIG. 2 differs from the embodiment illustrated in FIG. 1 basically in the provision utilized to divide the volume of inner cylinder 20 into liquid propellant reservoir 30 and air chamber 28. Thus, as illustrated in FIG. 2, instead of using a stationary frangible disk to separate liquid propellant reservoir 30 from air chamber 28, a movable piston, generally indicated at 60 is utilized. This piston includes a radial piston head 62 corresponding to disk 24 in FIG. 1. This piston head is slidingly received in cylinder 20, with the fit between the peripheral edge of the piston head and cylinder wall being sufficiently tight to prevent leakage of liquid propellant into air chamber 28. Alternatively, the peripheral edge of the piston head can be fitted with a gasket to seal reservoir 30 against liquid propellant leakage. Again the gasket material must be chemically compatible with the liquid propellant. A piston support member in the form of a rod 64, integrally formed with or otherwise connected to the piston head 62, extends actually through reservoir 30. The free end of this piston rod is received in an opening 66 formed in endwall 16. The fit between the piston rod and the housing opening is sufficiently tight to prevent liquid propellant leakage or a liquid propellant compatible gasket can be used. The piston rod provides guidance and support for piston head 62. Piston 60 may be formed of metal or a reinforced plastic that is chemically compatible with the liquid propellant.

Still referring to FIG. 2, a plurality of axially extending port 68 are drilled through piston head 62 to provide fluid communication between reservoir 30 and air chamber 28. These ports are closed off by frangible seals 70 of the same character as the frangible seals utilized in the embodiment of FIG. 1.

When initiator 54 is fired to pressurize air chamber 28, piston 60 is driven rearwardly. By virtue of the increased pressure in chamber 28 and the compression of the volume of reservoir 30, seals 70 will rupture, opening ports 68. Liquid propellant flows through ports 68 into chamber 28 in a metered manner for controlled combustion in chamber 28. Seals 40 will then rupture to open ports 38 and admit the gas generated by exothermic reaction in chamber 28 into cooling chamber 34. This exothermic reaction reaches a steady state condition as piston 60 continues to be propelled rearwardly, thereby expelling all of the liquid propellant from reservoir 34 through ports 68 into chamber 28.

The provision of piston 60 and the defined metering ports in piston head 62 serve to afford better control of the combustion of liquid propellant in chamber 28 than can be achieved in the embodiment of FIG. 1.

Figure 3:
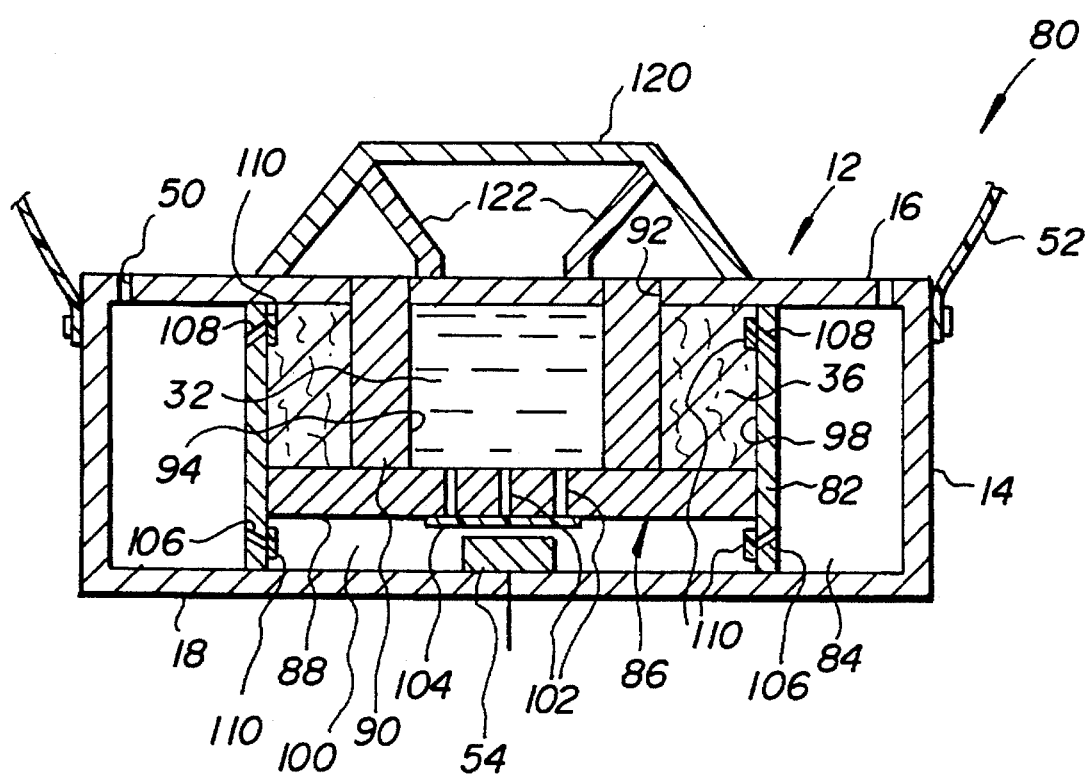
FIG. 3 is a sectional view of a safety bag inflation apparatus according to a third embodiment of the present invention.

The embodiment of FIG. 3 provides a safety bag inflation apparatus, generally indicated at 80, that is structured to provide improved cooling of the gas generated during liquid propellant combustion. This embodiment uses the piston approach of the embodiment of FIG. 2, not only to afford a high degree of control of liquid propellant combustion, but also to control the interaction of the generated gas with a cooling medium in the form of a liquid, preferably water. Thus as seen in FIG. 3, a single larger diameter cylinder 82 is positioned in housing 12 in coaxial relation with sidewall 14. The radial space between cylinder 82 and housing sidewall 14 defines an annular air chamber 84. A piston, generally indicated at 86, is slidingly received within cylinder 82 and includes a radial piston head 88 and a rearwardly extending, cylindrical piston support member 90. The free end of this support member is received in an annular opening 92 in endwall 16. The interior of the cylindrical support member 90 defines a reservoir 94 for liquid propellant 32. The radial separation between cylinder 82 and support member 90 defines an annular cooling chamber 98 containing a liquid gas cooling medium 36, preferably calcium carbonate treated water.

Piston head 88 serves as a separator between air chamber 100 at the front side and reservoir 94 and cooling chamber 98 at the back side. A plurality of axially extending ports 102 are drilled through piston head 88 to provide fluid communication between reservoir 94 and air chamber 100. These ports are normally closed off by one or more frangible seals 104. An annular array of ports 106 are drilled through cylinder 82 at locations adjacent endwall 18 to provide fluid communication between central air chamber 100 and annular air chamber 84. A second annular array of ports 108 are drilled through cylinder 82 at locations adjacent endwall 16 to provide fluid communication between cooling chamber 98 and annular chamber 84. Ports 104 and 106 are normally closed by frangible seals 110.

Considering the operation of the apparatus 80 of FIG. 3, when initiator 54 is fired to pressurize air chamber 100, piston 86 is driven rearwardly causing frangible seals 104 to rupture, opening ports 102 in piston head 88. Liquid propellant is metered through these opened ports into air chamber 100 where combustion occurs to generate gas. Seals 110 will then rupture to open ports 106, allowing gas to flow from air chamber 100 into annular air chamber 84. The rearwardly moving piston 86 compresses the volume of cooling chamber 98 causing seals 110 to rupture, opening ports 108. Water flows through these open ports from cooling chamber 96 into air chamber 84 where it is vaporized by the high temperature gas. The cooled gas and vaporized water flow through housing ports 50 to inflate safety bag 52. As illustrated in the embodiment of FIG. 3, housing vents 50 may be provided in endwall 16 rather than sidewall 14. As also illustrated in FIG. 3, ports 104 and 106 are preferably drilled through cylinder 82 at acute angles, such that the water and gas flow into chamber 84 along converging paths, so as to enhance the gas cooling and water vaporization action occurring in this chamber. It will be appreciated that vaporization of the gas cooling water adds to the volume of safety bag inflating fluid.

To permit a reduction in the space required to accommodate operation of inflation apparatus 80 and to support the central portion of endwall 16 surrounded by annular opening 92, housing 12 is provided with a rearward extension structure, generally indicated at 120, in the shape of a truncated cone. Angled interior members 122 extend from the portion of endwall 16 surrounded by opening 92 rearwardly and laterally to junctions with cone structure 120. It is seen that these members cross the path of rearward movement of piston support member 90. By forming piston support member 90 of a lightweight metal or plastic, the free end of this support member, upon encountering interior members 122 during piston rearward movement, will be split, radially collapsed, and fragmented by the wedging action of these members. Thus space to accommodate full rearward extension of support member 90 is not required at the installation site of apparatus 80. It will be appreciated that similar structure may be added to the embodiment of FIG. 2 to collapse piston rod 62 as piston 60 contracts reservoir 30.

Since the liquid propellant composition includes an oxidizer, the pressure buffer chambers 28 (FIGS. 1 and 2) and 100 (FIG. 3) need not be filled with air. A denser gas fill, such as argon or nitrogen (at atmospheric or elevated pressure) provides a better heat sink than air for pre-cooling the liquid propellant combustion gas. Also, a more dense gas will make a greater contribution to the safety bag inflating fluid volume than air. Thus, less liquid propellant would require to inflate the safety bag. This being the case, a denser gas may be included with the cooling medium in the cooling chambers and used to fill the outer chambers 42 and 84. In the latter case, it may be necessary to normally block housing vents 52 with frangible seals.

It will be apparent to those skilled in the art that various modifications and variations can be made in the safety bag inflation apparatus of the present invention without departing from the spirit or scope of the invention. Thus, it is intended that the present invention cover the modifications and variations of this invention provided they come within the scope of the appended claims and their equivalents.

What is claimed is:

1. Occupant restraint apparatus for a motor vehicle, comprising:
    an inflatable safety bag;
    a housing having at least one vent in inflating fluid flow communication with the safety bag;
    a reservoir of liquid propellant positioned in the housing;
    a buffer zone positioned in the housing;
    a first frangible seal separating the liquid propellant reservoir from the buffer zone;
    a second frangible seal blocking fluid flow communication between the buffer zone and the housing vent; and
    an inflation initiator, operating in response to a high impact vehicular accident, for pressurizing the buffer zone to initiate rupture of the first and second frangible seals and to ignite the liquid propellant in the buffer zone, ignition of the liquid propellant generating by exothermic reaction, a gas flowing from the buffer zone through the housing vent to inflate the safety bag.

2. The occupant restraint apparatus of claim 1, which further includes a cooling zone positioned between the buffer zone and the housing vent for cooling the safety bag inflating gas.

3. The occupant restraint apparatus of claim 2, wherein the buffer zone pressurized by the inflation initiator is a first buffer zone, the apparatus further including a second buffer zone positioned between the cooling zone and the housing vent.

4. The occupant restraint apparatus of claim 1, wherein the buffer zone contains air or a gas of greater density than air.

5. The occupant restraint apparatus of claim 3, wherein the first and second buffer zones contain air or a gas of greater density than air.

6. The occupant restraint apparatus of claim 2, wherein the cooling zone contains a gas cooling medium.

7. The occupant restraint apparatus of claim 6, wherein the gas cooling medium is a liquid capable of vaporization by the safety bag inflating gas.

8. The occupant restraint apparatus of claim 6, wherein the gas cooling medium is a porous metallic medium.

9. Apparatus for deploying an inflatable member, comprising:
    a housing having an exit vent communicating with the inflatable member;
    a reservoir of liquid propellant centrally located in the housing;
    an air chamber centrally located in the housing adjacent the reservoir;
    a first frangible seal blocking fluid communication between the reservoir and the air chamber;
    an annular cooling chamber surrounding at least the air chamber and containing a gas cooling medium;
    a second frangible seal blocking fluid communication between the air chamber and the cooling chamber; and
    an inflation initiator operable to pressurize the air chamber, rupture the first frangible seal and ignite the liquid propellant released from the reservoir into the air chamber, the ignited liquid propellant generating, by exothermic reaction, a gas to further pressurize the air chamber and rupture the second frangible seal, whereupon the gas flows from the air chamber through the gas cooling medium in the cooling chamber and out the housing exit vent to inflate the member.

10. The apparatus of claim 9, wherein the inflation initiator is a pyrotechnic detonator located in the air chamber.

11. The apparatus of claim 9, wherein the annular cooling chamber includes a cylinder inner wall and a cylindrical outer wall, the inner wall including at least one first port in fluid communication with the air chamber and normally closed by the second frangible seal, the outer wall including at least one second port in fluid communication with the housing exit vent and in axially displaced relation with the first port.

12. The apparatus of claim 11, wherein the cooling chamber surrounds both the liquid propellant reservoir and the air chamber.

13. The apparatus of claim 11, wherein the first port comprising an annular array of the first ports, each closed by separate second frangible seals, an annular array of the second ports, and an annular array of the exit vents.

14. The apparatus of claim 13, which further includes an annular air chamber surrounding the cooling chamber in fluid communication with the exit vents, the second ports being in fluid communication with the annular air chamber.

15. The apparatus of claim 14, which further includes a third frangible seal closing each of the second ports, the third frangible seals rupturing upon pressurization of the cooling chamber by the gas entering the cooling chamber from the centrally positioned air chamber.

16. The apparatus of claim 9, wherein the cooling medium is a porous metallic medium.

17. The apparatus of claim 9, wherein the cooling medium is liquid capable of vaporization by the gas.

18. Apparatus for deploying an inflatable member, comprising:
    a housing having a plurality of vents in fluid communication with the inflatable member;
    a cylinder positioned in the housing;
    a piston slidably received in the cylinder and including a piston head dividing the cylinder into a reservoir containing a liquid propellant and an air chamber;
    a plurality of first ports in the piston head between the reservoir and the air chamber, the first ports being normally closed by first frangible seals;

a plurality of second ports in the cylinder providing fluid communication between the air chamber and the housing vents, the second ports being normally closed by second frangible seals; and an inflation initiator operable to pressurize the air chamber and drive the piston in a direction contracting the reservoir, whereupon the first frangible seals rupture and liquid propellant flowing through the first ports into the air chamber is ignited to generate a gas, by exothermic reaction, further pressurizing the air chamber to rupture the second frangible seals and allow the gas to flow through the second ports and the housing vents, deploying the inflatable member.

19. The apparatus of claim 18, which further includes an annular cooling chamber surrounding the cylinder and through which the gas flows from the second ports to the housing vents, the cooling chamber containing a gas cooling medium consisting of a porous metallic medium or a liquid capable of vaporization by the gas.

20. The apparatus of claim 19, which further includes an annular air chamber surrounding the cooling chamber, the gas flowing through the annular air chamber from the cooling chamber to the housing vents.

21. The apparatus of claim 20, which further includes third ports between the cooling chamber and the annular air chamber, the third ports being normally closed by third frangible seals that rupture upon pressurization of the cooling chamber by the gas, and the third ports being axially displaced relative to the second ports and the housing vents.

22. The apparatus of claim 18, wherein the piston further includes a cylindrical support member extending from the piston head in a direction away from the air chamber, the liquid propellant reservoir provided within the support member, the apparatus further comprising:

an annular cooling chamber provided between the support member and the cylinder, the cooling chamber containing a vaporizable liquid;

an annular air chamber surrounding the cylinder in fluid communication with the housing vents and the second ports;

a plurality of third ports in the cylinder between the cooling chamber and the annular air chamber, the third ports normally closed by third frangible seals, whereby, upon pressurization of the air chamber, the piston is driven in the direction to contract both the reservoir and the cooling chamber, the third frangible seals rupturing to allow the liquid to flow through the third ports into the annular air chamber where the liquid is vaporized by the gas flowing through the second ports into the annular air chamber.

23. The apparatus of claim 22, wherein the second and third ports are oriented to direct the gas and the fluid respectively, in converging directions to enhance vaporization of the liquid and cooling of the gas in the annular air chamber.

24. The apparatus of claim 18, wherein the piston has a support member with a free end opposite from the piston head, and wherein the free end is slidingly received through an opening in the housing.

25. The apparatus of claim 22, wherein the inflation initiator is pyrotechnic detonator situated in the air chamber.

26. The apparatus of claim 24, wherein the housing includes an extension in the form of a truncated cone structure positioned to collapse at least a portion of the free end of the support member protruding from the housing as the piston is driven in the reservoir and cooling chamber contracting direction.

27. A method for deploying an inflatable member, comprising the steps of:

providing a reservoir of liquid propellant;

providing a buffer zone containing air;

providing a member initially separating the reservoir and the buffer zone;

releasing the liquid propellant through the separating member at the time deployment is desired;

igniting the liquid propellant released from the reservoir into the buffer zone to generate a gas by exothermic reaction;

cooling the gas; and inflating the member with the cooled gas.

28. The method of claim 27, wherein the separating member is a stationary frangible seal, and wherein the releasing and igniting steps are performed by detonating an explosive charge to pressurize the buffer zone and rupture the frangible seal, detonation of the charge generating combusting matter in the buffer zone for igniting the liquid propellant released from the reservoir.

29. The method of claim 27, wherein the separating member is a movable piston having ports initially closed by frangible seals, wherein the releasing and igniting steps are performed by detonating an explosive charge to pressurize the buffer zone and rupture the frangible seals, detonation of the charge generating combusting matter in the buffer zone for igniting the liquid propellant released from the reservoir through the ports.

\* \* \* \* \*